United States Patent
Grandl et al.

(10) Patent No.: US 11,931,673 B2
(45) Date of Patent: Mar. 19, 2024

(54) DEFOAMING FORMULATIONS CONTAINING ORGANOPOLYSILOXANES

(71) Applicant: WACKER CHEMIE AG, Munich (DE)

(72) Inventors: Markus Grandl, Burghausen (DE); Christoph Deckert, Burghausen (DE); Elisabeth Hoelzlwimmer, Simbach (DE); Corinna Sage, Emmerting (DE); Josef Wimmer, Burghausen (DE)

(73) Assignee: WACKER CHEMIE AG, Munich (DE)

(*) Notice: Subject to any disclaimer, the term of this patent is extended or adjusted under 35 U.S.C. 154(b) by 319 days.

(21) Appl. No.: 17/292,572

(22) PCT Filed: Nov. 28, 2018

(86) PCT No.: PCT/EP2018/082899
§ 371 (c)(1),
(2) Date: May 10, 2021

(87) PCT Pub. No.: WO2020/108750
PCT Pub. Date: Jun. 4, 2020

(65) Prior Publication Data
US 2022/0001301 A1    Jan. 6, 2022

(51) Int. Cl.
*B01D 19/04* (2006.01)
*C08L 83/14* (2006.01)
*C11D 3/00* (2006.01)
*C11D 3/37* (2006.01)
*D21C 3/28* (2006.01)
*D21H 17/59* (2006.01)
*D21H 21/12* (2006.01)
*C08K 3/32* (2006.01)

(52) U.S. Cl.
CPC ........ *B01D 19/0409* (2013.01); *C11D 3/0026* (2013.01); *C11D 3/373* (2013.01); *D21C 3/28* (2013.01); *D21H 17/59* (2013.01); *D21H 21/12* (2013.01); *C08K 2003/329* (2013.01)

(58) Field of Classification Search
CPC ... C08L 83/14; B01D 19/0409; C11D 3/0026; C11D 3/373
See application file for complete search history.

(56) References Cited

U.S. PATENT DOCUMENTS

| | | |
|---|---|---|
| 2,632,736 A | 3/1953 | Currie et al. |
| 3,383,327 A | 5/1968 | Sullivan et al. |
| 3,560,401 A | 2/1971 | O'Hara et al. |
| 4,145,308 A | 3/1979 | Simoneau et al. |
| 4,292,434 A | 9/1981 | Lindner et al. |
| 5,153,258 A * | 10/1992 | Nakahara ........... B01D 19/0409 524/588 |
| 5,223,595 A | 6/1993 | Stepp et al. |
| 6,034,225 A * | 3/2000 | Weidner ................. D21H 19/32 524/848 |
| 6,258,913 B1 | 7/2001 | Herzig et al. |
| 6,605,183 B1 | 8/2003 | Rautschek et al. |
| 6,998,437 B2 | 2/2006 | Stepp et al. |
| 7,105,581 B2 | 9/2006 | Burger et al. |
| 7,619,043 B2 * | 11/2009 | Rautschek ......... B01D 19/0404 524/588 |
| 9,120,035 B2 | 9/2015 | Brehm et al. |
| 2006/0160908 A1 * | 7/2006 | Rautschek ............. C08L 83/04 524/588 |
| 2008/0167487 A1 | 7/2008 | Schaefer et al. |
| 2015/0119509 A1 | 4/2015 | Brehm et al. |
| 2017/0087483 A1 * | 3/2017 | Mitra ................... C11D 3/0026 |
| 2018/0193771 A1 | 7/2018 | Brehm et al. |

FOREIGN PATENT DOCUMENTS

| | | |
|---|---|---|
| CN | 106474777 A | 3/2017 |
| DE | 2909758 A1 | 9/1979 |
| DE | 2925722 A1 | 2/1981 |
| DE | 3805661 A1 | 9/1989 |
| DE | 4116014 A1 | 11/1992 |
| DE | 4444175 A1 | 6/1996 |
| DE | 102005022856 A1 | 11/2006 |
| EP | 110370 B1 | 4/1987 |
| EP | 341952 A2 * | 5/1989 |
| EP | 338577 A2 | 10/1989 |
| EP | 217501 B1 | 7/1991 |
| EP | 163541 B1 | 4/1992 |
| EP | 273448 B1 | 9/1993 |
| EP | 516109 B1 | 5/1995 |
| EP | 499364 B1 | 10/1996 |
| EP | 434060 B2 | 3/1998 |

(Continued)

OTHER PUBLICATIONS

G. Engelhardt et al., Uber Die 1H-, 13C-Und 29Si-NMR Chemischen Verschiebungen Einiger Linearer, Verzweigter Und Cyclischer Methyl-Siloxan-Verbindungen, Journal of Organometallic Chemistry, 1971, vol. 28, pp. 293-300.
Elizabeth A. Williams, Chapter 8—NMR Spectroscopy of Organosilicon Compounds, The Chemistry of Organic Silicon Compounds, 1989, John Wiley and Sons, Ltd., pp. 511-533.
Nikolai D. Denkov et al., Mechanisms of Action of Mixed Solid-Liquid Antifoams. 1. Dynamics of Foam Film Rupture, Langmuir, 1999, vol. 15, pp. 8514-8529.
Nikolai D. Denkov, Mechanisms of Action of Mixed Solid-Liquid Antifoams. 2. Stability of Oil Bridges in Foam Films, Langmuir, 1999, vol. 15, pp. 8530-8542.
Nikolai D. Denkov et al., Mechanisms of Action of Mixed Solid-Liquid Antifoams. 3. Exhuastion and Reactivation, Langmuir, 2000, vol. 16, pp. 2515-2528.

(Continued)

*Primary Examiner* — Marc S Zimmer
(74) *Attorney, Agent, or Firm* — BROOKS KUSHMAN P.C.

(57) ABSTRACT

Rapid and long lasting defoaming is accomplished by use of a defoamer formulation employing an organopolysiloxane having siloxy groups linked by an alkylene group, a filler, a silicone resin, a silanol-terminated organopolysiloxane, and an inorganic or organic acid.

17 Claims, No Drawings

(56) References Cited

FOREIGN PATENT DOCUMENTS

| | | | |
|---|---|---|---|
| EP | 887097 | A1 | 12/1998 |
| EP | 1060778 | A1 | 12/2000 |
| EP | 1076073 | B1 | 1/2003 |
| EP | 1369449 | B1 | 2/2004 |
| EP | 1167502 | B1 | 4/2004 |
| EP | 2846891 | B1 | 6/2016 |
| GB | 2257709 | A * | 1/1993 |
| GB | 2257709 | A1 | 1/1993 |
| JP | 3188905 | A | 8/1991 |
| JP | H07-060008 | A | 3/1995 |
| JP | 8196811 | A | 8/1996 |
| JP | 2010540233 | A | 12/2010 |
| JP | 2014534046 | A | 12/2014 |
| JP | 2015522401 | A | 8/2015 |
| WO | 2003029338 | A1 | 4/2003 |
| WO | 2011069868 | A2 | 6/2011 |

OTHER PUBLICATIONS

Krastanka G. Marinova et al., Model Studies on the Mechanism of Deactivation (Exhaustion) of Mixed Oil-Silica Antifoams, Langmuir, 2003, vol. 19, pp. 3084-3089.
P. Garrett, The Science of Defoaming, Chapter 4.5 Oil Bridges and Antifoam Mechanism, 2014, CRC Press, pp. 141-165.
Co-Pending United States Patent Application "Defoaming Formulations Containing Organopolysiloxanes", U.S. Appl. No. 17/292,576, filed May 10, 2021.
Co-Pending United States Patent Application "Defoaming Formulations Containing Organopolysiloxanes", U.S. Appl. No. 17/292,584, filed May 10, 2021.

* cited by examiner

DEFOAMING FORMULATIONS CONTAINING ORGANOPOLYSILOXANES

CROSS REFERENCE TO RELATED APPLICATIONS

This application is the U.S. National Phase of PCT Appln. No. PCT/EP2018/082899 A1 filed Nov. 28, 2018, the disclosure of which is incorporated in its entirety by reference herein.

BACKGROUND OF THE INVENTION

1. Field of the Invention

The invention relates to defoamer formulations containing organopolysiloxanes and to the use thereof as defoamers, in particular in aqueous surfactant systems.

2. Description of the Related Art

In many liquid, in particular aqueous, systems containing surface-active compounds as desired or else undesired constituents, foam formation can present problems when these systems are brought into more or less intensive contact with gaseous substances, for example during gassing of wastewaters, during intensive stirring of liquids, in distillation, scrubbing or dyeing processes or in filling procedures.

This foam may be controlled by mechanical means or by addition of defoamers. Siloxane-based defoamers have proven particularly useful.

Improving the performance of siloxane-based defoamers is a constant process. A multiplicity of scientific papers (for example Denkov et al. Langmuir, 1999, 15, 8514, Langmuir, 1999, 15, 8530 or, in summary, P. Garrett, The science of defoaming, CRC Press, 2014, Chapter 4.5 "Oil Bridges and Antifoam Mechanism", v.a. pp. 152 ff.) are concerned with the antifoam mechanism and in the case of siloxane-based defoamers the so-called bridging-stretching mechanism is favored. This mechanism is based on the siloxane-based defoamer first forming a bridge in the foam lamella, the tearing apart of which then results in destruction of the foam lamella. A sufficiently low viscosity and also good spreadability of the defoamer is therefore necessary in order that a bridge may be formed in the foam lamella.

In the course of the improvement process for the siloxane-based defoamers many papers have focused on increasing the rate of formation of this defoamer bridge and thus on increasing the instantaneous performance (also known as the foam knockdown) of defoamers. The incorporation of hydrophobic fillers, in particular silicas, has achieved marked efficiency enhancements here. The incorporation may thereby be effected by distribution of (pre)hydrophobized silica into a polydimethylsiloxane, e.g. according to DE 29 25 722 A. It is alternatively also possible to carry out an (in situ) hydrophobization, for example by heating of hydrophilic silica distributed in polydimethylsiloxanes, for example according to U.S. Pat. No. 3,383,327 A, or by using basic catalysts (U.S. Pat. No. 3,560,401 A).

A further performance enhancement may be effected when the siloxane-based defoamer contains not only a polydiorganosiloxane and silica but also a copolymer composed of $(CH_3)_3SiO_{1/2}$ and $SiO_2$ building blocks as is described for example in U.S. Pat. No. 4,145,308 A.

A performance enhancement of silicone-based defoamers is likewise possible by addition of polyether-polysiloxane copolymers. U.S. Pat. No. 7,105,581 B1 describes antifoam agents based on polyether-polysiloxane copolymers. These added copolymers are surfactants.

Typical silicone-based defoamer compositions may accordingly contain polysiloxanes, fillers such as hydrophobized silicas, copolymers composed of $(CH_3)_3SiO_{1/2}$ and $SiO_2$ units and polyether-polysiloxane copolymers.

The main focus in recent years has been increasing the long-term performance of siloxane-based defoamers. This aspect was investigated in a series of scientific papers (for example Denkov et al., Langmuir, 2000, 16, 2515 or Marinova et al. and Langmuir, 2003, 19, 3084). The loss of performance after a certain use time is described therein as "antifoam exhaustion" or else "antifoam deactivation" and attributed to a series of effects such as, for example, to a reduction in the particle size of the antifoam globules or to the emulsification of the antifoam agent present on the surface, or to the segregation of polydimethylsiloxane and silica into two different populations of antifoam globules (silica-depleted and silica-enriched).

The use of incipiently crosslinked or in some cases already rubber-like polydimethylsiloxanes as part of a defoamer to impart an elastic moment to the defoamer has been proposed in recent decades to counter these effects and thus enhance long-term performance.

Such incipiently crosslinked or in some cases already rubber-like polydimethylsiloxanes have been produced for example by incorporation of silsesquioxane units into the polydimethylsiloxane (via cohydrolysis) (U.S. Pat. No. 2,632,736 A) by incorporation of an alkoxysilane or a copolymer composed of $(CH_3)_3SiO_{1/2}$ and $SiO_2$ units into the polydimethylsiloxane (via equilibration and/or condensation) (EP 163 541 A2 and EP 217 501 A2) or by free-radical crosslinking of polydimethylsiloxanes (for example DE 3805661 A1 and EP 273 448 A2). The production of incipiently crosslinked and branched siloxanes by reaction of terminally vinyl-containing siloxanes with Si—H-functional siloxanes in the context of a hydrosilylation has been proposed as an alternative (for example EP 434 060 A2, EP 516 109 A1, DE 44 44 175 A1 and GB 2257709 A1).

However, these processes are very unspecific, often exhibit poor reproducibility and frequently afford products which are difficult to handle since they operate near the gel point. These processes are accordingly also performed either in an inert polysiloxane or in the presence of a large excess of one of the reaction partners (generally the vinyl-containing component) as solvent. Intentionally highly crosslinked or even gelled products which, however, are then in turn combined with a relatively large excess of linear polysiloxanes for the sake of handleability have also been produced (for example EP 499 364 A1).

Characterization of the incipiently crosslinked or in some cases already rubberlike polydimethylsiloxanes is often carried out by methods known from elastomer characterization such as for example penetration depth (EP 434 060 A2), the WeiPenberg effect (DE 38 05 661) or else rheological characterization. For example in EP 499 364 A1 defoamers are gelled or are gelled in an emulsion and the elastomer property is characterized via the loss factor (tan delta) and the dynamic elasticity modulus (G') at a frequency of 10 Hz and 25° C. and an amplitude of <2%. According to WO 2011/069868 A2, by incorporation of polysiloxanes of very high viscosity (>1 Mio mPas), siloxane-based defoamers are imparted with an elastic moment described by determination of the loss factor (tan delta) at 1 Hz and an amplitude of 1%.

A disadvantage when using incipiently crosslinked or in some cases rubberlike polydimethylsiloxanes is that such formulations exhibit a large increase in viscosity with increasing storage time of the defoamer compound. Defoamer formulations containing polyether-polysiloxane copolymers exhibit the increase in viscosity described significantly more rapidly than formulations without the addition. This has a disadvantageous effect on their handling, in particular on their flowability, meterability and emulsifiability.

The object consisted of providing defoamer formulations based on siloxanes having both good storage stability, in particular a largely constant viscosity over a period of several weeks, and high defoaming efficiency, not only directly after the preparation thereof but also after storage thereof.

SUMMARY OF THE INVENTION

The invention relates to defoamer formulations containing:
(1) organopolysiloxanes containing per molecule at least one structural unit of general formula $$O_{1/2}R_2Si\text{—}Y\text{—}SiRO_{2/2} \quad (I)$$

and at least 2 units of general formula $$R^1R_2SiO_{1/2} \quad (II)$$

and units of general formula $$R_2SiO_{2/2} \quad (III),$$

wherein
R may be identical or different and represents a monovalent SiC-bonded hydrocarbon radical having 1 to 30 carbon atoms which may contain one or more nonadjacent oxygen atoms and which is free from aliphatic carbon-carbon multiple bonds and
$R^1$ is R or an alkenyl radical having 2 to 30 carbon atoms, preferably a methyl radical or a vinyl radical, wherein at least one alkenyl radical per molecule is present,
Y represents a divalent hydrocarbon radical having 2 to 30 carbon atoms,
with the proviso that the organopolysiloxane contains a structural element of formula $$R_2Y^2SiO\text{—}(SiR_2O)_{x1}\text{—}SiRY^1O\text{—}(SiR_2O)_{x2}\text{—}SiR_2R^1 \quad (IV),$$

wherein
R and $R^1$ are as defined above,
$Y^1$ represents a divalent hydrocarbon radical having 2 to 30 carbon atoms which is bonded to a group having the formula $SiR_2O_{1/2}$,
$Y^2$ represents a divalent hydrocarbon radical having 2 to 30 carbon atoms which is bonded to a group having the formula $SiRO_{2/2}$, and
$x_1$ and $x_2$ is 0 or an integer,
with the proviso that the sum of $x_1+x_2$ is x,
wherein x is on average more than 5, preferably more than 10, and less than 100, by preference less than 80, preferably less than 60,
(2) fillers,
(3) organopolysiloxane resins composed of units of general formula $$R^2_e(R^3O)_fSiO_{(4-e-f)/2} \quad (V),$$

wherein
$R^2$ may be identical or different and represents a hydrogen atom or a monovalent, optionally substituted, SiC-bonded hydrocarbon radical having 1 to 30 carbon atoms, $R^3$ may be identical or different and represents a hydrogen atom or a monovalent, optionally substituted hydrocarbon radical having 1 to 4 carbon atoms,
e is 0, 1, 2 or 3 and
f is 0, 1, 2, or 3,
with the proviso that the sum of e+f is not more than 3 and that the sum of e+f is 2 in less than 50% of all units of formula (V) in the organopolysiloxane resin,
(4) silanol-containing organopolysiloxanes of the general formula $$XSiR^4_2O\text{—}(SiR^4_2O)_n\text{—}SiR^4_2X \quad (VI)$$

wherein
$R^4$ may be identical or different and represents a monovalent SiC-bonded hydrocarbon radical having 1 to 30 carbon atoms, which may contain one or more nonadjacent oxygen atoms, and
X represents a hydrogen atom, an optionally substituted $C_1$-$C_{18}$-hydrocarbon radical, a $C_1$-$C_{18}$-alkoxy group or a hydroxyl group —OH,
n has integer values between 0 and 1000, preferably between 10 and 400, preferably between 50 and 250, with the proviso that on average 30 to 60 mol %, preferably 50 mol %, of the groups X correspond to hydroxyl groups —OH, wherein the silanol-containing organopolysiloxanes may also contain small proportions of branchings, preferably T units ($R^4SiO_{3/2}$) and Q units ($SiO_2$), wherein small proportions signify 0 to 1 mol %, preferably 0 to 0.02 mol %, based on the sum of all siloxane units in the organopolysiloxane, and
(5) inorganic or organic acids.

DETAILED DESCRIPTION OF THE PREFERRED EMBODIMENTS

The defoamer formulations according to the invention may optionally contain as further constituents
6) polyorganosiloxanes of general formula $$R^5R_2SiO(SiR_2O)_mSiR_2R^5 \quad \text{or} \quad (VIIa)$$

(VIIb)

wherein
R may be identical or different and is as defined above,
$R^5$ may be identical or different and may be R or —$OR^6$, wherein
$R^6$ represents a hydrogen atom or a monovalent, optionally substituted hydrocarbon radical having 1 to 25 carbon atoms,
m is an integer, preferably from 1 to 2500, m is preferably chosen such that the polyorganosiloxanes of formula (VIIa) have a viscosity of 10 to 1 000 000 mPa·s at 25° C. and 101.425 kPa,
n is an integer, preferably from 2 to 20, n is preferably chosen such that the polyorganosiloxanes of formula (VIIb) have a viscosity of 2 to 15 mPa·s at 25° C. and 101.425 kPa,
wherein the polyorganosiloxanes may also contain small proportions of branchings, preferably T units ($R^5SiO_{3/2}$) and Q units ($SiO_2$), optionally
(7) water-insoluble organic compounds, optionally
(8) polyether-modified polysiloxanes which may be linear or branched and contain at least one polyether group and optionally
(9) alkaline or acidic catalysts or their reaction products with the components (1) to (8).

Organopolysiloxanes (1) are the primary components in the defoamer formulations according to the invention and are therefore present in a greater amount than any further component (2) to (9).

It is preferable when the defoamer formulations contain
(1) at least 30% by weight, preferably at least 40% by weight, more preferably at least 50% by weight, and preferably at most 97% by weight, more preferably at most 90% by weight, most preferably at most 85% by weight, of organopolysiloxanes,
(2) at least 1% by weight, preferably at least 2% by weight, more preferably at least 3% by weight, and preferably at most 15% by weight, more preferably at most 12% by weight, most preferably at most 10% by weight, of fillers,
(3) at least 1% by weight, preferably at least 2% by weight, more preferably at least 3% by weight, and preferably at most 15% by weight, more preferably at most 12% by weight, most preferably at most 10% by weight, of organopolysiloxane resins composed of units of the formula (V),
(4) at least 0.01% by weight, preferably at most 10% by weight, more preferably at most 5% by weight, of a silanol-containing organopolysiloxane of the formula (VI)
(5) at least 0.01% by weight, more preferably at most 3% by weight, and most preferably at most 1% by weight, of an inorganic or organic acid.
(6) 0% by weight or more, preferably at least 3% by weight, more preferably at least 5% by weight, and preferably at most 40% by weight, more preferably at most 30% by weight, most preferably at most 20% by weight, of polyorganosiloxanes of general formula (VIIa) or (VIIb),
(7) 0% or more by weight and preferably at most 15% by weight, more preferably at most 10% by weight, most preferably at most 7.5% by weight, of water-insoluble organic compounds,
(8) 0% or more by weight and preferably at most 15% by weight, more preferably at most 10% by weight, most preferably at most 7.5% by weight, of polyether-modified polysiloxanes which may be linear or branched and bear at least one polyether group, and
(9) 0% or more by weight, preferably at least 0.05% by weight, more preferably at least 0.1% by weight, and preferably at most 1% by weight, preferably at most 0.5% by weight, and most preferably at most 0.3% by weight, of alkaline or acidic catalysts or reaction products thereof with the components (1) to (8),
in each case based on the total weight of the defoamer formulations.

It is preferable when the defoamer formulations consist of the components (1) to (5) and optionally (6) and optionally (7) and optionally (8) and optionally (9).

It is preferable when the organopolysiloxanes (1) employed in the defoamer formulations are organopolysiloxanes producible when (A) oligomeric or polymeric organosilicon compounds containing units of general formula $$R^1R_2SiO_{1/2} \quad (II),$$

units of general formula $$R_2SiO_{2/2} \quad (III),$$

and units of general formula $$HRSiO_{2/2} \quad (VIII)$$

wherein
R and $R^1$ are as defined above,
with the proviso that
at least one alkenyl radical $R^1$ per molecule is present,
the sum of the units $HRSiO_{2/2}$ and $R^1R_2SiO_{1/2}$ is on average greater than 2.0,
and the number of alkenyl radicals $R^1$ is on average greater than the number of Si-bonded hydrogen atoms
and optionally
(B) oligomeric or polymeric organosilicon compounds containing units of general formula $$R^7R_2SiO_{1/2} \quad (IX) \text{ and}$$

units of general formula $$R_2SiO_{2/2} \quad (III)$$

wherein
R is as defined above and
$R^7$ is an alkenyl radical having 2 to 30 carbon atoms, preferably a vinyl radical,
are reacted in the presence of
(C) catalysts which promote the addition of Si-bonded hydrogen onto aliphatic double bonds,
wherein the employed ratio of aliphatic double bond in the components (A) and optionally (B) to Si-bonded hydrogen in the component (A) is 1.2 to 10, by preference 1.5 to 5.0, more preferably 1.7 to 3.0.

It is preferable when the oligomeric or polymeric organosilicon compounds (A) employed to produce the organopolysiloxanes (1) used in the defoamer formulations are those of formula $$R^1R_2SiO-(SiR_2O)_x-(HSiRO)_y-SiR_2R^1 \quad (X),$$

wherein
R, $R^1$ and x are as defined above,
and y is on average at least 0.5, preferably at least 0.6, more preferably at least 0.7, and on average at most 1.5, preferably at most 1.2 and more preferably at most 1.0,
with the provisos that at least one alkenyl radical $R^1$ per molecule is present,
the sum of the units $HRSiO_{2/2}$ and $R^1R_2SiO_{1/2}$ is on average greater than 2.0,
and the number of alkenyl radicals $R^1$ is on average greater than the number of Si-bonded hydrogen atoms.

It is preferable when the oligomeric or polymeric organosilicon compounds (B) optionally employed to produce the organopolysiloxanes (1) used in the defoamer formulation are those of formula $$R^7R_2SiO-(SiR_2O)_z-O-SiR_2R^7 \quad (XI),$$

wherein R and $R^7$ are as defined above and
z is on average more than 5, more preferably more than 10, and less than 1000, preferably less than 500, most preferably less than 250.

Examples of hydrocarbon radicals R are alkyl radicals, such as the methyl, ethyl, n-propyl, isopropyl, 1-n-butyl, 2-n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical and the 2-ethylhexyl radical, nonyl radicals such as the n-nonyl radical, decyl radicals such as the n-decyl radical, dodecyl radicals such as the n-dodecyl radical, tetradecyl radicals such as the n-tetradecyl radical, hexadecyl radicals such as the n-hexadecyl radical, and octadecyl radicals such as the n-octadecyl radical; cycloalkyl radicals such as the cyclopentyl, cyclohexyl, cycloheptyl, methylcyclohexyl and 4-ethylcyclohexyl radicals; aryl radicals, such as the phenyl, naphthyl, anthryl and phenanthryl radicals; alkaryl radicals, such as o-, m-, p-tolyl radicals, xylyl radicals and ethylphenyl radicals; and aralkyl radicals, such as the benzyl radical and the α- and β-phenylethyl radicals.

The hydrocarbon radicals R may contain ether or polyether groups.

Preferred examples of R are methyl, ethyl and phenyl radicals. A particularly preferred example is the methyl radical.

When $R^1$ has the definition of R, the examples given above for R as well as the preferred examples specified for R, apply to $R^1$.

When $R^1$ is an alkenyl radical, examples of alkenyl radicals $R^1$ are the vinyl, allyl and 3-butenyl, 5-hexenyl, 7-octenyl, 9-decenyl and the 11-dodecenyl radicals, wherein the vinyl radical and the 5-hexenyl radical are preferred and the vinyl radical is particularly preferred.

It is preferable when the organopolysiloxanes (1) contain on average more than two alkenyl radicals $R^1$.

It is preferable when Y is a divalent hydrocarbon radical having 1 to 12 carbon atoms, more preferably having 2 carbon atoms, wherein the radical of formula —$CH_2CH_2$— is particularly preferred.

It is preferable when $Y^1$ and $Y^2$ are in each case a divalent hydrocarbon radical having 1 to 12 carbon atoms, more preferably having 2 carbon atoms, wherein the radical of formula —$CH_2CH_2$— is particularly preferred.

Examples of Y in the structural unit (I) and of $Y^1$ and $Y^2$ in the structural unit (IV) are those of formula —$CH_2CH_2$—, —$CH(CH_3)$—, —$(CH_2)_4$—, —$(CH_2)_5$—, —$(CH_2)_6$—, —$(CH_2)_8$—, —$(CH_2)_{10}$—, —$(CH_2)_{12}$—, wherein the radicals of formula —$CH_2CH_2$—, —$CH(CH_3)$—, —$(CH_2)_6$— and —$(CH_2)_8$— are preferred and the radical of formula —$CH_2CH_2$— is more preferred.

Y and $Y^1$ and $Y^2$ may also be unsaturated. Examples of these are radicals of the formula —CH=CH— (cis or trans) and —C(=$CH_2$)—.

In the organopolysiloxanes (1) according to the invention, a preferred example of a unit of formula (II) is the trimethylsiloxane unit or the vinyldimethylsiloxane unit, wherein in particular at least one vinyldimethylsiloxane unit per molecule is present.

Preferred examples of units of formula (III) are dimethylsiloxane units.

$R^2$ preferably represents a hydrocarbon radical having 1 to 30 carbon atoms.

Examples of hydrocarbon radicals R apply in their entirety to hydrocarbon radicals $R^2$.

Preferred examples of radicals $R^2$ are the methyl, ethyl and phenyl radicals.

Examples of radicals $R^3$ are the hydrogen atom and alkyl radicals such as the methyl, ethyl, n-propyl, isopropyl and n-butyl radicals.

It is preferable when the radical $R^3$ is a hydrogen atom or a methyl or ethyl radical.

Examples of radicals $R^6$ are the hydrogen atom and alkyl radicals such as the methyl, ethyl, n-propyl, isopropyl and n-butyl radicals and the isotridecyl, n-octyl, stearyl, 4-ethylhexadecyl, 2-octyl-1-dodecyl or eicosanyl radicals.

It is preferable when the radical $R^6$ is a hydrogen atom or a $C_1$-$C_{25}$-alkyl radical such as a methyl, ethyl or 2-octyl-1-dodecyl radical.

Preferred examples of radicals $R^5$ are the methyl, ethyl and phenyl radicals and the hydroxyl, methoxy, ethoxy and 2-octyl-1-dodecyloxy radicals.

Optionally employed polyorganosiloxanes of formula (VIIa) where $R^5$ is a radical —$OR^6$ are obtainable for example by alkaline-catalyzed condensation of silanol-terminated polydimethylsiloxanes and aliphatic alcohols, such as isotridecyl alcohol, n-octanol, stearyl alcohol, 4-ethylhexadecanol, 2-octyl-1-dodecanol or eicosanol.

Examples of radicals $R^7$ are the vinyl, allyl and 3-butenyl, 5-hexenyl, 7-octenyl, 9-decenyl and the 11-dodecenyl radicals, wherein the vinyl radical and the 5-hexenyl radical are preferred and the vinyl radical is more preferred.

The viscosity of the organopolysiloxanes (1) employed in the defoamer formulations according to the invention is preferably at least 50 mPa·s, more preferably at least 500 mPa·s, and by preference at most 10,000 mPa·s, and more preferably at most 5000 mPa·s, in each case at 25° C. and 101.425 kPa.

Organopolysiloxanes (1) may also contain a small amount, preferably 0 to 1 mol %, in particular 0 to 0.02 mol %, based on the sum of all siloxane units, of other siloxane units, such as $RSiO_{3/2}$ (T) units or $SiO_2$ (Q) units (where R is as defined above).

Organopolysiloxanes (1) and processes for the production thereof are for example described in U.S. Pat. No. 6,258,913 B1, in particular column 11, line 6 to column 12, line 50 (incorporated by reference).

It is possible to employ one type of organopolysiloxanes (1) or a mixture of at least two types of organopolysiloxanes (1).

In the case of organosilicon compounds (A) used for producing the organopolysiloxanes (1) employed in the defoamer formulation according to the invention, a preferred example of a unit of formula (II) is the trimethylsiloxane unit or the vinyldimethylsiloxane unit, wherein in particular at least one vinyldimethylsiloxane unit per molecule is present.

Preferred examples of units of formula (III) are dimethylsiloxane units.

A preferred example of a unit of formula (VIII) is the hydrogenmethylsiloxane unit.

Organosilicon compounds (A), such as those of formula (X), are for example produced by equilibration of organopolysiloxanes having terminal units of formula $R^1R_2SiO_{1/2}$ with organopolysiloxanes having Si-bonded hydrogen atoms in $HRSiO_{2/2}$ units, wherein R and $R^1$ are as defined above.

The organosilicon compound (A) preferably has a viscosity of 5 to 150 mPa·s at 25° C.

In the case of the organosilicon compounds (B) optionally used for producing the organopolysiloxanes (1) employed in the defoamer formulations according to the invention, a preferred example of a unit of formula (IX) is the vinyldimethylsiloxane unit.

Preferred examples of units of formula (III) are dimethylsiloxane units.

Organosilicon compounds (B), in particular of formula (XI), are known and are produced by equilibration of organopolysiloxanes having terminal units of formula $R^7R_2SiO_{1/2}$ with cyclic organopolysiloxanes or HO— or alkoxy-terminated organopolysiloxanes having units of formula $R_2SiO$, where R and $R^7$ are as defined above.

The organosilicon compound (B) preferably has a viscosity of 5 to 100,000 mPa·s at 25° C.

Employable catalysts (C) which promote the addition of Si-bonded hydrogen onto aliphatic double bonds in the process according to the invention include the same catalysts as could also previously be used for promoting the addition of Si-bonded hydrogen onto aliphatic double bonds.

The catalysts (C) are preferably selected from a metal from the group of platinum metals or a compound or a complex from the group of platinum metals. Examples of such catalysts are metallic and finely divided platinum, which may be on supports, such as silicon dioxide, aluminum oxide or activated carbon; compounds or complexes of platinum, such as platinum halides, for example, $PtCl_4$, $H_2PtCl_6 \cdot 6H_2O$, $Na_2PtCl_4 \cdot 4H_2O$, platinum-olefin complexes, platinum-alcohol complexes, platinum-alkoxide complexes, platinum-ether complexes, platinum-aldehyde complexes, platinum-ketone complexes, including reaction products of $H_2PtCl_6 \cdot 6H_2O$ and cyclohexanone, platinum-vinyl-siloxane complexes, such as platinum-1,3-divinyl-1,1,3,3-tetramethyldisiloxane complexes with or without a content of detectable inorganically bound halogen, bis(gamma-picoline) platinum dichloride, trimethylenedipyridineplatinum dichloride, dicyclopentadieneplatinum dichloride, dimethylsulfoxideethyleneplatinum(II) dichloride, cyclooctadieneplatinum dichloride, norbornadieneplatinum dichloride, gamma-picoline-platinum dichloride, cyclopentadieneplatinum dichloride, and also reaction products of platinum tetrachloride with olefin and primary amine or secondary amine or primary and secondary amine according to U.S. Pat. No. 4,292,434, such as the reaction product of 1-octene-dissolved platinum tetrachloride with sec-butylamine, or ammonium-platinum complexes according to EP-B 110 370.

The catalyst (C) is preferably used in amounts from 1 to 100 ppmw (parts by weight per million parts by weight), preferably in amounts of 4 to 20 ppmw, in each case calculated as elemental platinum and based on the total weight of the components (A) and optionally (B).

The process for producing the organopolysiloxanes (1) used in the defoamer formulation according to the invention is preferably performed at the pressure of the ambient atmosphere, i.e. at about 1020 hPa (abs.), though it may also be performed at higher or lower pressures.

Moreover, the process is by preference performed at a temperature of 50° C. to 180° C., more preferably 60° C. to 140° C.

Inert, organic solvents may be co-used in the production process although co-use of inert, organic solvents is not preferred. Examples of inert, organic solvents are toluene, xylene, octane isomers, butyl acetate, 1,2-dimethoxyethane, tetrahydrofuran and cyclohexane.

The optionally co-used inert organic solvents are subsequently removed by distillation. Highly polymeric products preferably remain dissolved in the inert solvent.

The fillers (2) employed in the defoamer formulations according to the invention preferably have a BET surface area of 20 to 1000 $m^2/g$. The fillers (2) preferably have a particle size of less than 10 μm and an agglomerate size of less than 100 μm.

Examples of fillers (2) are silicon dioxide (silica), titanium dioxide, aluminum oxide, metal soaps, quartz flour, PTFE powder, fatty acid amides, for example ethylene bisstearamide, and finely divided hydrophobic polyurethanes.

Preferably employed as fillers (2) are silicon dioxide (silica), titanium dioxide or aluminum oxide having a BET surface area of 20 to 1000 $m^2/g$. These fillers preferably have a particle size of less than 10 μm and an agglomerate size of less than 100 μm.

Preferred as fillers (2) are silicas, in particular those having a BET surface area of 50 to 800 $m^2/g$. These silicas may be pyrogenic or precipitated silicas. Both pretreated silicas, i.e. hydrophobic silicas, and hydrophilic silicas are employable as fillers (2). Examples of commercial hydrophobic silicas that may be employed in accordance with the invention are HDK® H2000, a pyrogenic silica treated with hexamethyldisilazanes and having a BET surface area of 140 $m^2/g$ (commercially available from Wacker Chemie AG, Germany) and a precipitated silica treated with polydimethylsiloxane and having a BET surface area of 90 $m^2/g$ (commercially available under the name "Sipernat D10" from Degussa AG, Germany).

Hydrophilic silicas may also be hydrophobized in situ if this is advantageous for the desired performance of the defoamer formulation. Processes for hydrophobizing silicas are well known. The in situ hydrophobizing of the hydrophilic silica may thereby be effected for example by several hours of heating the silica dispersed in the component (1) or (6) or in a mixture of the components (1), (3) and optionally (6) and optionally (7) to temperatures of 100° C. to 200° C. The reaction may thereby be supported by the addition of catalysts, such as KOH, and of hydrophobizing agents, such as short-chain OH-terminated polydimethylsiloxanes, silanes or silazanes.

The component (3) used in the defoamer formulations according to the invention takes the form of silicone resins composed of units of formula (V) in which preferably in less than 30%, preferably in less than 5%, of the units in the resin the sum of e+f equals 2.

The organopolysiloxane resins (3) composed of units of formula (V) are preferably
MQ resins composed of units of the formulae
$SiO_2$ (Q units) and
$R^2_3SiO_{1/2}$ (M units),
wherein $R^2$ is as defined above.

The molar ratio of M units to Q units is preferably in the range from 0.5 to 2.0, more preferably in the range from 0.6 to 1.0. In addition to the M and Q units the MQ resins may optionally also contain small amounts of $R^2SiO_{3/2}$ or $(R^3O)SiO_{3/2}$ (T) units or $R^2_2SiO_{2/2}$ (D) units, preferably in amounts of 0.01 to 20 mol %, more preferably 0.01 to 5 mol %, based on the sum of all siloxane units, wherein $R^3$ is as defined above. These MQ resins may also contain up to 10% by weight of free Si-bonded hydroxyl or alkoxy groups, such as methoxy or ethoxy groups.

These organopolysiloxane resins (3) preferably have a viscosity of greater than 1000 mPa·s or are solids at 25° C. and 101.425 kPa. The weight-average molecular weight determined by gel permeation chromatography (based on a polystyrene standard) of these resins is preferably 200 to 200,000 g/mol, in particular 1000 to 20,000 g/mol.

Examples of polyorganosiloxanes (6) optionally employed in the defoamer formulations according to the invention are polydimethylsiloxanes of formula (VIIa) having a viscosity of 10 to 1,000,000 mPa·s or cyclic polydimethylsiloxanes of formula (VIIb) having a viscosity of 2 to 15 mPa·s, in each case at 25° C. and 101.425 kPa.

Though not shown in formula (VIIa), these polyorganopolysiloxanes (6) may contain 0 to 1 mol %, preferably 0 to 0.02 mol %, based on the sum of all siloxane units, of other siloxane units, such as $RSiO_{3/2}$ (T) units or $SiO_2$ (Q) units (where R is as defined above).

Component (4) used in the defoamer formulations according to the invention takes the form of silanol-containing organosiloxanes of formula (VI).

Silanol-containing organopolysiloxanes (4) are preferably those of the general formula $$R'R^4{}_2SiO\text{---}(SiR^4{}_2O)_n\text{---}SiR^4{}_2OH \qquad (VIa),$$

wherein

R$^4$ may be identical or different and represents a monovalent SiC-bonded hydrocarbon radical having 1 to 30 carbon atoms, which may contain one or more nonadjacent oxygen atoms, R' represents a hydrogen atom or an optionally substituted $C_1$-$C_{18}$-hydrocarbon radical, preferably a hydrogen atom or a $C_1$-$C_{18}$-hydrocarbon radical which may contain one or more halogen, O, S or N atoms or one or more —C(═O)— or —C(═O)O— groups, and n has integral values between 0 and 1000, preferably between 10 and 400, more preferably between 50 and 250.

These compounds can be prepared, for example, as a reaction product of the ring-opening polymerization of hexamethyltrisiloxane and basic initiators. The preparation can be carried out, for example, in accordance with DE 41 16014 A1, EP 0 338 577 A2, EP 1 369 449 B1 or DE 10 2005 022 856 A1.

Though not shown in formula (VIa), these polyorganopolysiloxanes (4) may contain 0 to 1 mol %, preferably 0 to 0.02 mol %, based on the sum of all siloxane units, of other siloxane units, such as $R^4SiO_{3/2}$ (T) units or $SiO_2$ (Q) units (where R is as defined above).

Examples of hydrocarbon radicals R$^4$ are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical and the 2-ethylhexyl radical, nonyl radicals such as the n-nonyl radical, decyl radicals such as the n-decyl radical, dodecyl radicals such as the n-dodecyl radical, tetradecyl radicals such as the n-tetradecyl radical, hexadecyl radicals such as the n-hexadecyl radical, and octadecyl radicals such as the n-octadecyl radical; cycloalkyl radicals such as the cyclopentyl, cyclohexyl, cycloheptyl, methylcyclohexyl and 4-ethylcyclohexyl radicals; aryl radicals, such as the phenyl, naphthyl, anthryl and phenanthryl radicals; alkaryl radicals, such as o-, m-, p-tolyl radicals, xylyl radicals and ethylphenyl radicals; and aralkyl radicals, such as the benzyl radical and the α- and β-phenylethyl radicals. The hydrocarbon radicals R may contain ether or polyether groups.

Preferred examples of R$^4$ are methyl, ethyl, propyl, butyl and phenyl radicals. A particularly preferred example is the methyl radical.

When R$^4$ is an alkenyl radical, examples of alkenyl radicals R$^4$ are the vinyl, allyl, 3-butenyl, 5-hexenyl, 7-octenyl, 9-decenyl and the 11-dodecenyl radicals, wherein the vinyl radical and the 5-hexenyl radical are preferred and the vinyl radical is particularly preferred.

The examples given above of hydrocarbon radicals R$^4$ also apply in their entirety to the unsubstituted hydrocarbon radicals R'.

Example of substituted hydrocarbon radicals R' are haloalkyl radicals such as the 3,3,3-trifluoro-n-propyl radical, 2,2,2,2',2',2'-hexafluoroisopropyl radical, the heptafluoroisopropyl radical; haloaryl radicals such as the o-, m- and p-chlorophenyl radicals; and acyloxyalkyl radicals such as the acetoxyethyl radical and (meth)acryloxypropyl radical.

The silanol-containing organopolysiloxanes (4) are preferably those of the formula $$R'Me_2SiO\text{---}(SiMe_2O)_n\text{---}SiMe_2OH \qquad (VIb),$$

wherein

Me is a methyl group,

R' represents a hydrogen atom or an optionally substituted $C_1$-$C_{18}$-hydrocarbon radical, preferably a hydrogen atom or a $C_1$-$C_{18}$-hydrocarbon radical, which may contain one or more halogen, O, S or N atoms or one or more C(═O)— or —C(═O)O— groups and n has integral values between 50 and 250.

Examples of these are:

$Me_3Si$—$(OSiMe_2)_n$—OH $BuMe_2Si$—$(OSiMe_2)_n$—OH $HMe_2Si$—$(OSiMe_2)_n$—OH $(H_2C$═$CH)Me_2Si$—$(OSiMe_2)_n$—OH $(H_2C$═$CH$—$CH_2)Me_2Si$—$(OSiMe_2)_n$—OH $(CF_3CH_2CH_2)Me_2Si$—$(OSiMe_2)_n$—OH $(H_2C$═$CHC$ (O) O $(CH_2)_3$) $Me_2Si$—$(OSiMe_2)_n$—OH $(H_2C$═$C$ (Me) C (O) O $(CH_2)_3$) $Me_2Si$—$(OSiMe_2)_n$—OH $(H_3C)_2CH$—$CH_2$—$(OSiMe_2)_n$—OH $H_3C$—$(CH_2)_2$—$(OSiMe_2)_n$—OH $(H_3C)_2CH$—$(OSiMe_2)_n$—OH $H_3C$—$CH_2$—$(OSiMe_2)_n$—OH $H_3C$—$(OSiMe_2)_n$—OH $H_2C$═$CH$—$CH_2$—$(OSiMe_2)_n$—OH $H_2C$═$CH$—$(CH_2)_9$—$(OSiMe_2)_n$—OH $H_2C$═$CH$—$C$ (O) O—$CH_2$—$CH_2$—$(OSiMe_2)_n$—OH $H_2C$═$CH$—$C$ (O)—$(OC_2H_4)_2$—$(OSiMe_2)_n$—OH $(H_3C)_3Si$—$CH_2$—$(OSiMe_2)_n$—OH

L-(-)$H_3C$—$CH_2$—OOC—$(H_3C)HC$—$(OSiMe_2)_n$—OH $H_2C$═$CH$—O—$(CH_2)_4$—$(OSiMe_2)_n$—OH $H_3C$—C (═O) $CH_2$—$(OSiMe_2)_n$—OH $(H_3C)_2N$—$(CH_2)_2$ $(OSiMe_2)_n$—OH $CH_2$═$CHCH_2$—$[(OC_2H_4)_{20}$ $(OC_3H_6)_{20}]$—$[OSiCH_3)_2]_n$—OH

HS—$CH_2CH_2$—$(OSiMe_2)_n$—OH where M is a methyl radical and Bu is a butyl radical and n has the definition specified above.

The weight average molecular weight Mw (based on a polystyrene standard) of these silanol-containing organopolysiloxanes, determined by gel permeation chromatography, is preferably 200 to 200,000 g/mol, in particular 1000 to 30,000 g/mol.

The silanol-containing polyorganosiloxanes (4) used in the defoamer formulations according to the invention preferably have a viscosity of 10 to 10 000 mPa·s, preferably 10 to 600 mPa·s, at 25° C. and 101.425 kPa.

The acids (5) used according to the invention can be inorganic or organic acids in pure form or diluted as an aqueous or organic solution. "Organic acids" are defined as all organic compounds having one or more carbon atoms that have one or more acid functions selected from the group of carboxylic acids, sulfonic acids or phosphonic acids or have an ammonium function.

"Inorganic acids" are selected from the group of mineral acids or from the group of ammonium salts of inorganic or organic acids. These include, for example, hydrohalic acids and non-metallic oxoacids, and ammonium salts thereof and the ammonium salts of organic acids.

Examples of inorganic acids are hydrocyanic acid, phosphoric acid, phosphorous acid, phosphinic acid, sulfuric acid, sulfurous acid, thiosulfuric acid, polysulfuric acids, hydrochloric acid, nitric acid, nitrous acid, boric acid, chlorosulfonic acid, dioxoboric acid, diphosphoric acid, disulfuric acid, silicic acids, wherein phosphoric acid is preferred.

Examples of ammonium salts of inorganic acids are ammonium chloride, ammonium acetate, ammonium sulfate, ammonium persulfate, ammonium nitrate, ammonium molybdate and ammonium bromide.

Other examples of ammonium salts are also the ammonium salts of the organic acids listed below.

Organic acids include saturated and unsaturated carboxylic acids, sulfonic acids and phosphonic acids and the corresponding acids of organic amines.

Examples of saturated, monobasic organic acids are formic acid, acetic acid, propionic acid, butyric acid, valeric acid, caproic acid, enanthic acid, caprylic acid, pelargonic acid, capric acid, gluconic acid, glucuronic acid, taurine, arginine, glycine, glycolic acid. Examples of saturated dibasic and polybasic organic acids are oxalic acid, malonic acid, succinic acid, glutaric acid, adipic acid, pimelic acid, suberic acid, azelaic acid, sebacic acid, tartronic acid, tartaric acid, malic acid, α-ketoglutaric acid, fumaric acid, maleic acid, hydroxyfumaric acid, tartronic acid, ketomalonic acid, oxalpropionic acid, oxalacetate, lactic acid, oxaloacetic acid and citric acid, wherein formic acid, acetic acid, propionic acid are preferred and acetic acid is particularly preferred.

Examples of unsaturated or aromatic organic acids are benzoic acid, phthalic acid, isophthalic acid, terephthalic acid.

Organic sulfonic acids include alkyl and aryl sulfonic acids such as methanesulfonic acid, ethanesulfonic acid, trifluoromethanesulfonic acid, trichloromethanesulfonic acid, toluenesulfonic acids, phenolsulfonic acids and 4-alkylsulfonic acids.

The group of organic amines includes, for example, mono-, di- or trialkylamines or aryl-, alkylarylamines. Examples are dimethylamine, diethylamine, butylamine, diisopropylamine, diisopropylethylamine, monoethanolamine, aniline, o-, m-, -p-alkylaniline.

The acids and salts can be added either dissolved in water or organic solvents at any concentration.

Water-insoluble organic compounds (7) may be employed in the defoamer formulations according to the invention.

In the context of the present invention the term "water-insoluble" is to be understood as meaning a solubility in water at 25° C. and a pressure of 101.425 kPa of not more than 3% by weight.

The optionally employed component (7) is preferably selected from water-insoluble organic compounds having a boiling point greater than 100° C. at the pressure of the ambient atmosphere, i.e. at 900 to 1100 hPa, especially those selected from mineral oils, natural oils, isoparaffins, polyisobutylenes, residues from oxo alcohol synthesis, esters of low molecular weight synthetic carboxylic acids, for example pentanediol-1,3-diisobutyrate, fatty acid esters, for example octyl stearate, dodecyl palmitate or isopropyl myristate, fatty alcohols, ethers of low molecular weight alcohols, phthalates, esters of phosphoric acid and waxes.

Polyether-modified polysiloxanes (8) which may be linear or branched and bear at least one polyether group may be employed in the defoamer formulations according to the invention. Such polyether-modified polysiloxanes are known and described for example in EP 1076073 A1, in particular page 2, line 35 to page 4, line 46 (incorporated by reference).

Examples of alkaline catalysts (9) are alkali metal and alkaline earth metal hydroxides, such as NaOH, KOH, CsOH, LiOH and Ca(OH)$_2$. Examples of acidic catalysts (9) are hydrochloric acid, sulfuric acid and phosphonitrilic chlorides.

The reaction products of (9) with the components (1) to (8) are for example the product of the silica preferred as the filler (2) with alkali metal hydroxides, for example potassium silicate or sodium silicate.

The metered addition of the catalysts may be carried out in typical organic solvents such as alcohols (e.g. methanol, ethanol, isopropanol) or esters (e.g. ethyl acetate).

The components (2) to (9) employed in the defoamer formulations according to the invention may in each case be one type of such a component or else a mixture of at least two types of a respective component.

One day after the preparation thereof, the defoamer formulations according to the invention preferably have a viscosity at 25° C. and 101.425 kPa of at least 5000 mPa·s and preferably at most 150,000 mPa·s, preferably at most 20,000 mPa·s, and after eight weeks storage at 25° C. and 101.425 kPa, preferably have a viscosity of at most 400,000 mPa·s, preferably at most 20,000 mPa·s.

The production of the defoamer formulations according to the invention may be carried out by known processes, such as by mixing all components, for example using high shear forces in colloid mills, dissolvers or rotor-stator homogenizers. The mixing procedure may thereby be carried out at reduced pressure to prevent incorporation of air which is present in highly disperse fillers for example. Where required, the in situ hydrophobization of the fillers may then follow.

It is also possible to initially charge and optionally to heat the components (1) and then successively to add the components (2), (3), (4), (5), optionally (6) and optionally (7) and optionally (8) and optionally (9).

In a preferred embodiment component (3) is added in dissolved form as a solution in component (6) or parts of the component (6) or as a solution in component (7) or parts of the component (7).

The invention further provides emulsions containing defoamer formulations according to the invention, emulsifiers and water.

When the defoamer formulations according to the invention are emulsions, all emulsifiers known to those skilled in the art for producing silicone emulsions, for example nonionic, anionic or cationic emulsifiers, may be employed.

It is preferable to employ emulsifier mixtures, wherein at least one nonionic emulsifier should be present.

Examples (nonlimiting) of employed nonionic emulsifiers are:
1. Alkyl polyglycol ethers, preferably those having 3 to 30 EO units and alkyl radicals of 8 to 20 carbon atoms.
2. Carboxylic acid polyglycol esters, in particular fatty acid polyglycol esters, preferably those having more than 6 EO units and carboxylic acid radicals of 8 to 20 carbon atoms.
3. Ethoxylated or non-ethoxylated sorbitan fatty acid esters.
4. Ethoxylated castor oil or hydrogenated variants.
5. Polyglycerol carboxylic acid esters.
6. Alkyl polyglycosides of general formula R*—O-Z$_O$, wherein R* represents a linear or branched, saturated or unsaturated alkyl radical having on average 8-24 carbon atoms and Z$_O$ represents an oligoglycoside radical having on average O=1-10 hexose or pentose units or mixtures thereof.

7. Alkyl aryl polyglycol ethers, preferably those having 5 to 30 EO units and 8 to 20 carbon atoms in the alkyl and aryl radicals.
8. Ethylene oxide/propylene oxide(EO/PO) block copolymers, preferably those having 8 to 30 EO/PO units.
9. Polyvinyl alcohol further comprising 5 to 50%, preferably 8 to 20, vinyl acetate units having a degree of polymerization of 500 to 3000.
10. Addition products of alkyl amines having alkyl radicals of 8 to 22 carbon atoms with ethylene oxide or propylene oxide.
11. Natural substances and derivatives thereof, such as lecithin, lanolin, saponins, cellulose; cellulose alkyl ethers and carboxyalkylcelluloses, whose alkyl groups each comprise up to 4 carbon atoms.
12. Polar groups containing linear organo(poly)siloxanes containing in particular the elements O, N, C, S, P, Si, in particular those having alkoxy groups having up to 24 carbon atoms and/or up to 40 EO and/or PO groups.

Preferred nonionic emulsifiers are

1. Alkyl polyglycol ethers, preferably those having 3 to 30 EO units and alkyl radicals of 8 to 20 carbon atoms such as, e.g. Ceteareth-20, Oleth-10, Oleth-20, Laureth-3, Laureth-4, Laureth-20, Laureth-23, Trideceth-5, Trideceth-6, Trideceth-8, Trideceth-10, Trideceth-12, Trideceth-16, Trideceth-20, Steareth-20 or Steareth-21 (as per INCI).
2. Carboxylic polyglycol esters, in particular fatty acid polyglycol esters, preferably those having more than 6 EO units and carboxylic acid radicals of 8 to 20 carbon atoms, e.g. PEG-20 Stearate, PEG-20 Laurate, PEG-7 Olivate, PEG-8 Oleate, PEG-8 Laurate HLB PEG-6 Stearate, PEG-20-Stearate or PEG-100 Stearate (as per INCI).
3. Ethoxylated or non-ethoxylated sorbitan fatty acid esters, such as e.g. Sorbitan Laurate, Polysorbate 20, Polysorbate 60, Polysorbate 80 or Polysorbate 85 (as per INCI).
4. Ethoxylated castor oil or hydrogenated variants such as for example PEG 200 Castor Oil or PEG-60 hydrogenated Castor Oil (as per INCI nomenclature).
5. Polyglycerol carboxylic acid esters, for example polyglycerol-10 oleate, polyglycerol-10 laurate or polyglycerol-10 stearate.
6. Alkyl polyglycosides of general formula $R^*$—O-$Z_O$, wherein $R^*$ represents a linear or branched, saturated or unsaturated alkyl radical having on average 8-24 carbon atoms and $Z_O$ represents an oligoglycoside radical having on average O=1-10 hexose or pentose units or mixtures thereof, for example Glucopon 215, Glucopon 225, Glucopon 600 (trade name).

Examples (nonlimiting) of anionic emulsifiers are:
1. Alkyl sulfates, particularly those having a chain length of 8 to 18 carbon atoms, alkyl and alkaryl ether sulfates having 8 to 18 carbon atoms in the hydrophobic radical and 1 to 30 ethylene oxide (EO)/propylene oxide (PO) units.
2. Sulfonates, particularly alkyl sulfonates having 8 to 18 carbon atoms, alkylaryl sulfonates having 8 to 18 carbon atoms.
3. Alkali metal and ammonium salts of carboxylic acids having 8 to 20 carbon atoms in the alkyl, aryl, alkaryl or aralkyl radical, in particular alkali metal and ammonium salts of fatty acids, preferably those having carboxylic acid radicals of 8 to 20 carbon atoms.

Preferred anionic emulsifiers are alkali metal and ammonium salts of carboxylic acids having 8 to 20 carbon atoms in the alkyl, aryl, alkaryl or aralkyl radical, particularly preferred anionic emulsifiers are alkali metal and ammonium salts of fatty acids, preferably those having carboxylic acid radicals of 8 to 20 carbon atoms, for example sodium salts, potassium salts, triethanolammonium salts of lauric acid, myristic acid, palmitic acid, stearic acid or else oleic acid.

Examples (nonlimiting) of cationic emulsifiers are:
1. Salts of primary, secondary and tertiary fatty amines having 8 to 24 carbon atoms with acetic acid, sulfuric acid, hydrochloric acid and phosphoric acids.
2. Alkylpyridinium, alkylimidazolinium and alkyloxazolinium salts, in particular those whose alkyl chain has up to 18 carbon atoms, specifically the halides, sulfates, phosphates and acetates.
3. Quaternary alkylammonium and alkylbenzeneammonium salts, in particular those whose alkyl groups have 6 to 24 carbon atoms, in particular the halides, sulfates, phosphates and acetates.

It is also possible to add compounds known as thickeners, such as polyacrylic acid, polyacrylates, cellulose ethers such as carboxymethylcellulose and hydroxyethyl cellulose, polyurethanes, natural thickeners, for example xanthan gum, and also preservatives and other customary additives known to those skilled in the art.

The continuous phase of the emulsions according to the invention is preferably water. However, it is also possible to produce defoamer formulations according to the invention in the form of emulsions in which the continuous phase is formed by the components (1), (2), (3), (4), (5) and optionally (6) and optionally (8) and optionally (9) or is formed by component (7).

Multiple emulsions may also be concerned.

Processes for producing silicone emulsions are known. Production is typically effected by simple stirring of all constituents and optionally subsequent homogenizing with jet dispensers, rotor-stator homogenizers, colloid mills or high-pressure homogenizers.

If the composition according to the invention is selected from emulsions, preference is given to oil-in-water emulsions containing 5 to 50% by weight defoamer formulations according to the invention containing components (1) to (5) and optionally (6) and optionally (7) and optionally (8) and optionally (9), 1% to 20% by weight emulsifiers and optionally thickeners and 30% to 94% by weight water.

The compositions according to the invention may also be formulated as free-flowing powders. These are preferred for use in pulverulent washing compositions for example. The production of these powders from the inventive defoamer formulations containing components (1) to (5) and optionally (6) and optionally (7) and optionally (8) and optionally (9) is effected by processes known to those skilled in the art, such as spray drying or buildup granulation and with additives known to those skilled in the art.

The invention further provides powders containing defoamer formulations according to the invention and support materials.

The powders according to the invention preferably contain 2 to 20% by weight of the defoamer formulations according to the invention which contain the components (1) to (5) and optionally (6) and optionally (7) and optionally (8) and optionally (9).

Supports employed are for example zeolites, sodium sulfate, sodium bicarbonate, sodium carbonate, cellulose derivatives, urea and urea derivatives and sugar.

The powders according to the invention preferably contain 80% to 98% by weight support materials. Further possible constituents of the powders according to the invention are for example waxes or organic polymers as are described in EP-A 887097 and EP-A 1060778 for example.

The defoamer formulations according to the invention and also the emulsions or powders thereof may be employed anywhere where defoamer formulations based on organosilicon compounds have hitherto been employed.

This applies in particular to the control of foam in aqueous surfactant systems, for use in washing and cleaning compositions, for control of foam in wastewater plants, in textile dyeing processes, in natural gas scrubbing, in polymer dispersions and for defoaming of aqueous media generated in chemical pulp production.

The use of the defoamer formulations according to the invention in nonaqueous systems such as in tar distillation or crude oil processing is excluded.

The present invention thus further provides a process for defoaming and/or preventing foaming of media by mixing the defoamer formulations according to the invention or emulsions or powders thereof with the media.

The defoamer formulations according to the invention are preferably used for defoaming and/or for preventing foaming in aqueous media generated in chemical pulp production.

The defoamer formulations according to the invention may moreover be employed in washing and cleaning compositions and care compositions, for example fabric conditioner, wherein the defoamer formulations according to the invention may be used in substance or in the form of emulsions or powders.

The present invention thus further provides washing and cleaning compositions containing the inventive defoamer formulations or the inventive defoamer formulations in the form of emulsions or in the form of powders.

The addition of the defoamer formulation according to the invention to the foaming media may be effected directly, dissolved in suitable solvents, such as toluene, xylene, methyl ethyl ketone or tert-butanol, as a powder or as an emulsion. The amount necessary to achieve the desired defoamer performance depends for example on the nature of the medium, the temperature and the turbulence that occurs.

The defoamer formulations according to the invention are preferably added to the foaming medium in amounts of 0.1 ppmw to 1% by weight, in particular in amounts of 1 to 100 ppmw, based on the total weight of the medium to be defoamed.

It has been found that, surprisingly, the performance and handleability of the defoamer formulations according to the invention is substantially improved by the process according to the invention. The defoamer formulations according to the invention in particular feature a very good handleability and meterability and also a high performance in respect of both instantaneous foam collapse and long-term performance. The defoamer formulations according to the invention have the advantage that they feature a high, long-lasting performance in a very wide range of media at low addition amounts. This is exceptionally advantageous both economically and ecologically.

The defoamer formulations according to the invention have the advantage that they have good storage stability, i.e. that the viscosity hardly changes even after several weeks' storage, such as after 8 weeks' storage, at room temperature (20° C. and 1000 hPa). The defoamer formulations according to the invention thus have very good handling and meterability, even after storage, since they remain flowable, and are also highly effective even after storage both with regard to the instant foam breakdown and in the long-term effect.

In the examples which follow all information on parts and percentages are by weight unless otherwise stated. Unless otherwise stated, the examples described below are carried out at ambient pressure, i.e. at about 1000 hPa, and at room temperature, i.e. about 20° C. or at a temperature attained on combining the reactants at room temperature without additional heating or cooling.

Oscillation measurements on defoamer formulations were measured on an "MCR 302" rheometer from Anton Paar, using a plate-plate system (PP25). The instrument was calibrated with standard oil 10 000 of the German National Metrology Institute. The measuring temperature is 25.00° C.+/−0.05° C. and the measuring time is 3 minutes. The measurement uncertainty of the dynamic viscosity is 1.5%. The measured values given were measured at a deformation of 1% and a frequency of 1 Hz.

Kinematic viscosities are determined by means of a ViscoSystem® AVS 350 viscosity measuring system from Schott using Ubbelohde viscometer tubes having a constant (from Windaus or VWR for example) according to DIN 51562-part 1 or ISO/DIS 3105 (including calibration thereof). The measurements are carried out at a temperature of 25.0° C. (+−0.1° C.). The reported viscosity (reported in $mm^2/s$) is the arithmetic average of three independently performed individual measurements: The measurement uncertainty in the kinematic viscosity is 1.05%. Depending on the range of measurement different viscometer tubes having corresponding directional constants are used:

| Range of measurement | Capillary number | Directional constant |
|---|---|---|
| 0.5-3 $mm^2/s$ | 0c | 0.003K |
| 0.8-5 $mm^2/s$ | 0a | 0.005K |
| 1.2-10 $mm^2/s$ | I | 0.01K |
| 3-30 $mm^2/s$ | Ic | 0.03K |
| 10-100 $mm^2/s$ | II | 0.10K |
| 30-300 $mm^2/s$ | IIc | 0.30K |
| 100-1000 $mm^2/s$ | III | 1K |
| 300-3000 $mm^2/s$ | IIIc | 3K |
| 1000-10,000 $mm^2/s$ | IV | 10K |

Reported range of measurement, corresponding capillary number and constant as per VWR-Laborkatalog, 2011-2013, p. 645.8.

$^1$H-NMR-spectra are recorded as a solution in $CDCl_3$ in a Bruker Avance III HD NMR spectrometer (5 mm broadband probe with ATMA and Z-gradient) at a measuring frequency of 500.13 MHz.

$^{29}$Si-NMR spectra are recorded as a solution in $C_6D_6$-toluene in a Bruker Avance III HD NMR spectrometer (5 mm broadband probe with ATMA and Z-gradient) at a measuring frequency of 90.34 MHz.

Spectra are evaluated in a manner known to those skilled in the art and as described in the following literature: "Über die $^1$H-, $^{13}$C- und $^{29}$Si-NMR chemischen Verschiebungen einiger linearer, verzweigter und cyclischer Methyl-Siloxan-Verbindungen" [On the $^1$H-, $^{13}$C- and $^{29}$Si-NMR chemical shifts of some linear, branched and cyclic methylsiloxane compounds], G. Engelhardt, H. Jancke; J. Organometal. Chem. 28 (1971), 293-300; "Chapter 8—NMR spectroscopy of organosilicon compounds", Elizabeth A. Williams, The Chemistry of Organic Silicon Compounds, 1989 John Wiley and Sons Ltd, 511-533.

The Wijs iodine number determination is carried out according to DIN 53241-1:1995-05. The iodine number is defined by the amount in grams of iodine which is bound by 100 g of substance. The iodination of the double bonds present in the substance and back titration with sodium thiosulfate solution of the unconsumed iodine affords a metric for the extent of the olefin content; it must be noted that the determination also captures the hydrogen bonded to silicon.

EXAMPLES 1

Preparation of the Organosilicon Compounds (A):

a) Organosilicon Compound A1:

In a 500 ml three-necked flask, 101.0 g of an equilibrate of dimethylsiloxy and vinyldimethylsiloxy units having an iodine number of 22.0 with 2.7 g of a hydrolyzate of hydrogenmethyldichlorosilane terminated with trimethylsiloxy units and having a chain length of ca. 55 Si units, 120.0 g of an OH-terminated polydimethylsiloxane having a viscosity of 62 mm$^2$/s (25.0° C.; capillary no. II) and 28.6 g of an equilibrate of dimethylsiloxy and trimethylsiloxy units having a viscosity of 35 mm$^2$/s (25.0° C.; capillary no. II) are equilibrated for two hours with 250 ppm PNCl$_2$ at 120° C. and a reduced pressure of 20 mbar. The catalyst is deactivated by addition of NaHCO$_3$. After filtration and removal of volatile constituents at 160° C. and a reduced pressure of 40 mbar, a polysiloxane A1 having a viscosity of 81 mm$^2$/s (25.0° C.; capillary no. II), an iodine number of 13.3 and an H content of 0.016% by weight is obtained. The $^{29}$Si-NMR determination reveals a content of dimethylsiloxy units (corresponds to index x) of 52.

b) Organosilicon Compound A2:

In a 4 liter three-necked flask, 197 g of 1,3-divinyltetramethyldisiloxane with 75 g of a hydrolyzate of hydrogenmethyldichlorosilane terminated with trimethylsiloxy units and having a chain length of ca. 55 Si units, 2745 g of octamethylcyclotetrasiloxane and 55 g of hexamethyldisiloxane are equilibrated for 2.5 hours with 200 ppm PNCl$_2$ at 120° C. The catalyst is deactivated by addition of MgO. After filtration and removal of volatile constituents at 135° C. and a reduced pressure of 10 mbar, a polysiloxane A2 having a viscosity of 23 mm$^2$/s (25.0° C.; capillary no. II), an iodine number of 26.6 and an H content of 0.038% by weight is obtained. The $^{29}$Si-NMR determination reveals a content of dimethylsiloxy units (corresponds to index x) of 26.

c) Organosilicon compound A3:

In a 1000 ml three-necked flask, 497.4 g of an equilibrate of dimethylsiloxy and vinyldimethylsiloxy units having an iodine number of 24.7 with 17.1 g of a hydrolyzate of hydrogenmethyldichlorosilane terminated with trimethylsiloxy units and having a chain length of ca. 55 Si units, and 192.0 g of an equilibrate of dimethylsiloxy and trimethylsiloxy units having a viscosity of 34 mm$^2$/s (25.0° C.; capillary no. II) are equilibrated for two hours with 200 ppm PNCl$_2$ at 120° C. The catalyst is deactivated by addition of MgO. After filtration, a polysiloxane A3 having a viscosity of 24 mm$^2$/s (25.0° C.; capillary no. II), an iodine number of 25.7 and an H content of 0.037% by weight is obtained. Volatile constituents remain in the product. For analytical purposes a small amount of the obtained product was freed from volatile constituents at 135° C. and a reduced pressure of 10 mbar. The $^{29}$Si-NMR determination of this analytical sample reveals a content of dimethylsiloxy units (corresponds to index x) of 27.

EXAMPLES 2

Preparation of the Organopolysiloxanes (1):

a) Organopolysiloxane (1-1):

In a 250 ml three-necked flask 100.0 g of the polysiloxane A1 dissolved in 50 ml of xylene together with 0.2 g of a toluenic solution of Karstedt's Pt catalyst (Pt content: 0.3% by weight) are heated to 90° C. for 3.5 h. During the final cooling 0.3 g of diallyl maleate are added. Xylene is removed at 90° C. and under a reduced pressure of 32 mbar. A polysiloxane (1-1) having a viscosity of 425 mPa·s (measured at 25° C. and a shear rate of 1 1/s) is obtained.

Preparation of organopolysiloxane (1-1) thus employs exclusively polysiloxane A1 and the predominant component present is therefore structural element (IV) where x=52. (1-1) is in the form of a flowable compound not inclined to gelling. It is thus not necessary to use an inert solvent.

b) Organopolysiloxane (1-2):

In a 250 ml three-necked flask, 100.0 g of the polysiloxane A2 together with 55.0 g of a linear vinyldimethylsilyl-terminated polydimethylsiloxane having an iodine number of 1.99 together with 0.08 g of a solution of Karstedt's Pt catalyst in linear vinyldimethylsiloxane-terminated polydimethylsiloxane (Pt content: 1.0% by weight) are slowly heated to 135° C. and held at this temperature for one hour. An organopolysiloxane (1-2) having a viscosity of 2020 mPa·s (measured at 25° C. and a shear rate of 1 1/s) is obtained after cooling.

Preparation of organopolysiloxane (1-2) employs polysiloxane A2 in a large excess and structural element (IV) where x=26 is therefore present to a predominant extent. The ratio of vinyl to Si—H is 2.37. The linear vinyldimethylsilyl-terminated polydimethylsiloxane (component (B)) has thus been incorporated by reaction to a predominant extent and is therefore present in a minimal excess. Nevertheless, (1-2) is in the form of a flowable compound not inclined to gelling.

c) Organopolysiloxane (1-3):

In a 500 ml three-necked flask, 150.0 g of the polysiloxane A3 together with 30.0 g of an equilibrate of dimethylsiloxy and vinyldimethylsiloxy units having an iodine number of 6.6 together with 0.09 g of a solution of Karstedt's Pt catalyst in linear vinyldimethylsilyl-terminated polydimethylsiloxane (Pt content: 1.0% by weight) are slowly heated to 90° C. and held at this temperature for two hours. After cooling, volatile constituents are removed at 130° C. and a reduced pressure of 10 mbar to obtain an organopolysiloxane (1-3) having a viscosity of 1692 mPa·s (measured at 25° C. and a shear rate of 1 1/s).

Preparation of organopolysiloxane (1-3) also employs polysiloxane A3 in a large excess and structural element (IV) where x=27 therefore is present to a predominant extent. The ratio of vinyl to Si—H is 1.87. The linear vinyldimethylsilyl-terminated polydimethylsiloxane (component (B)) has thus likewise been incorporated by reaction to a predominant extent and is therefore likewise present in a minimal excess. Nevertheless, (1-3) is in the form of a flowable compound not inclined to gelling.

d) Organopolysiloxane (V1):

Preparation of an organopolysiloxane (V1) bridged via the structural unit $O_{2/2}RSi$—Y—$SiR_2O_{1/2}$ according to EP 434 060 A2 (noninventive):

In a 2 liter three-necked flask, 7.3 g of an organosilicon compound having the composition Me$_3$Si—(OSiMe$_2$)$_4$—(OSiHMe)$_4$—OSiMe$_3$ are initially charged together with 900.0 g of an equilibrate of dimethylsiloxy and vinyldimethylsiloxy units having a vinyl content of 1.23 mol %.

The ratio of vinyl groups to Si—H groups is 3.4:1. 0.28 g of a solution of Karstedt's Pt catalyst in linear vinyldimethylsilyl-terminated polydimethylsiloxane (Pt content: 1.0% by weight) are added and the reaction mixture is slowly heated to 80° C. and held at this temperature for one hour. A polysiloxane V1 having a viscosity of 7000 mm$^2$/s (25.0° C.; capillary no. IV) is obtained after cooling.

EXAMPLES 3

Preparation of the Non-Inventive Defoamer Formulations VC1, VC2 and VC3 with the Organopolysiloxanes (1-3) and V1:

To prepare the defoamer formulations, the substances (1), (2), (3), (6), (7) and (9) described in Table 1 are mixed with a dissolver and heated to 150° C. for 4 hours. After cooling, components (5) and (8) are incorporated, again using the dissolver and homogenized.

General Procedure for Preparing the Inventive Defoamer Formulations C1-C21 with the Organopolysiloxanes (Variant 1):

To prepare the defoamer formulations, the substances (1), (2), (3), (4), (6), (7) and (9) described in Table 1 are mixed with a dissolver and heated to 150° C. for 4 hours. After cooling, components (5) and (8) are incorporated, again using the dissolver and homogenized.

The inventive defoamer formulations C1-C21 with the organopolysiloxanes can also be prepared as follows (variant 2):

To prepare the defoamer formulations, the substances (1), (2), (3), (6), (7) and (9) described in Table 1 are mixed with a dissolver and heated to 150° C. for 4 hours. After cooling, components (4), (5) and (8) are incorporated, again using the dissolver and homogenized.

Substances Used:
(1-2): organopolysiloxane prepared according to Example 2b
(V1): organopolysiloxane prepared according to Example 2d
(2-1): a hydrophilic pyrogenic silica having a BET surface area of 300 m$^2$/g (obtainable from Wacker Chemie AG, Germany under the name HDK® T30)
(3-1): a silicone resin which is solid at room temperature and consists of (according to $^{29}$Si-NMR and IR analysis) 40 mol % $(CH_3)_3SiO_{1/2}$, 50 mol % $SiO_{4/2}$, 8 mol % $C_2H_5OSiO_{3/2}$ and 2 mol % $HOSiO_{3/2}$ units having a weight average molar mass of 7900 g/mol (based on polystyrene standard).
(4-1): a silanol-containing organosiloxane of the formula $Me_3Si$—$(OSiMe_2)_n$—OH having a viscosity of 400 mPa·s at 25° C.
(4-2): a silanol-containing organosiloxane of the formula $Me_3Si$—$(OSiMe_2)_n$—OH having a viscosity of 15 mPa·s at 25° C.
(5-1): acetic acid
(5-2): ortho-phosphoric acid, 85% aqueous solution
(6-1): a polydimethylsiloxane terminated with trimethylsiloxane groups having a viscosity of 100 mPa·s at 25° C. (obtainable under the name Wacker® AK 100 silicone oil from Wacker Chemie AG)
(7): aliphatic hydrocarbon obtainable under the name Isopar™ E Fluid from ExxonMobil
(8-1): a polyether-modified silicone copolymer of structure $(H_3C)_3Si$—$[Si\ (CH_3)_2O]_u$-$[GSi\ (CH_3)\ O]_v$—$Si\ (CH_3)_3$ where G=$(CH_2)_3$—(O—$CH_2CH_2$)$_w$—(O—CH($CH_3$)—$CH_2$)$_x$—OH, wherein u, v, w and x are chosen such that the polymer has a viscosity of 1100 mPa·s and a cloud point (according to DIN EN 1890) of 25° C.,
(9-1): a 20% methanolic solution of KOH.

TABLE 1

Comparative tests VC1, VC2 and VC3 - composition of defoamer formulations

| Comparative | VC1 Non-inventive Parts (component used) | VC2 Non-inventive Parts (component used) | VC3[1] Non-inventive Parts (component used) |
|---|---|---|---|
| Component (1) | 71.0 (1-2) | 71.0 (1-2) | 71.0 (V1) |
| Component (2) | 4.8 (2-1) | 4.8 (2-1) | 4.9 (2-1) |
| Component (3) | 3.8 (3-1) | 3.8 (3-1) | 3.8 (3-1) |
| Component (4) | 0.0 | 0.0 | 0.0 |
| Component (5) | 0.4 (5-1) | 0.1 (5-1) | 0.0 |
| Component (6) | 15.3 (6-1) | 15.3 (6-1) | 15.3 (6-1) |
| Component (7) | 0.0 | 0.0 | 0.0 |
| Component (8) | 4.0 (8-1) | 4.0 (8-1) | 4.0 (8-1) |
| Component (9) | 0.7 (9-1) | 0.7 (9-1) | 0.7 (9-1) |

[1]Comparative test VC3 according to EP 434 060 A2

TABLE 2

Composition of defoamer formulations - variation of the amount of component (4-1) at constant amount of acid (5)

| Example | C1 non-inventive, Parts (component used) | C2 Parts (component used) | C3 Parts (component used) | C4 Parts (component used) |
|---|---|---|---|---|
| Component (1) | 69.7 (1-2) | 69.7 (1-2) | 69.7 (1-2) | 69.7 (1-2) |
| Component (2) | 4.7 (2-1) | 4.7 (2-1) | 4.7 (2-1) | 4.7 (2-1) |
| Component (3) | 3.8 (3-1) | 3.8 (3-1) | 3.8 (3-1) | 3.8 (3-1) |
| Component (4) | 1.5 (4-1) | 0.5 (4-1) | 1.5 (4-1) | 2.5 (4-1) |
| Component (5) | 0.0 | 0.1 (5-2) | 0.1 (5-2) | 0.1 (5-2) |
| Component (6) | 15.3 (6-1) | 15.3 (6-1) | 15.3 (6-1) | 15.3 (6-1) |
| Component (7) | 0.0 | 0.0 | 0.0 | 0.0 |
| Component (8) | 4.0 (8-1) | 4.0 (8-1) | 4.0 (8-1) | 4.0 (8-1) |
| Component (9) | 0.7 (9-1) | 0.7 (9-1) | 0.7 (9-1) | 0.7 (9-1) |

TABLE 3

Composition of defoamer formulations - variation of the amount of component (4-1) at constant amount of acid (5):

| Example | C5a, C5b Parts (component used) | C6a, C6b Parts (component used) | C7a, C7b Parts (component used) |
|---|---|---|---|
| Component (1) | 69.7 (1-2) | 69.7 (1-2) | 69.7 (1-2) |
| Component (2) | 4.7 (2-1) | 4.7 (2-1) | 4.7 (2-1) |
| Component (3) | 3.8 (3-1) | 3.8 (3-1) | 3.8 (3-1) |
| Component (4) | 3.5 (4-1) | 4.5 (4-1) | 5.5 (4-1) |
| Component (5) | 0.1<br>C5a: (5-1)<br>C5b: (5-2) | 0.1<br>C6a: (5-1)<br>C6b: (5-2) | 0.1<br>C7a: (5-1)<br>C7b: (5-2) |
| Component (6) | 15.3 (6-1) | 15.3 (6-1) | 15.3 (6-1) |
| Component (7) | 0.0 | 0.0 | 0.0 |
| Component (8) | 4.0 (8-1) | 4.0 (8-1) | 4.0 (8-1) |
| Component (9) | 0.7 (9-1) | 0.7 (9-1) | 0.7 (9-1) |

TABLE 4

Composition of the defoamer formulations - variation of the amount of component (4-1) and acid (5):

| Example | C8a, C8b Parts (component used) | C9a, C9b Parts (component used) | C10a, C10b Parts (component used) |
|---|---|---|---|
| Component (1) | 69.7 (1-2) | 69.7 (1-2) | 69.7 (1-2) |
| Component (2) | 4.7 (2-1) | 4.7 (2-1) | 4.7 (2-1) |
| Component (3) | 3.8 (3-1) | 3.8 (3-1) | 3.8 (3-1) |
| Component (4) | 0.5 (4-1) | 1.5 (4-1) | 2.5 (4-1) |
| Component (5) | 0.2<br>C8a: (5-1)<br>C8b: (5-2) | 0.4<br>C9a: (5-1)<br>C9b: (5-2) | 0.6<br>C10a: (5-1)<br>C10b: (5-2) |
| Component (6) | 15.3 (6-1) | 15.3 (6-1) | 15.3 (6-1) |
| Component (7) | 0.0 | 0.0 | 0.0 |
| Component (8) | 4.0 (8-1) | 4.0 (8-1) | 4.0 (8-1) |
| Component (9) | 0.7 (9-1) | 0.7 (9-1) | 0.7 (9-1) |

TABLE 5

Composition of defoamer formulations - variation of the amount of component (4-2) at constant amount of acid (5)

| Example | C11 non-inventive, Parts (component used) | C12a, C12b Parts (component used) | C13a, C13b Parts (component used) | C14a, C14b Parts (component used) |
|---|---|---|---|---|
| Component (1) | 69.7 (1-2) | 69.7 (1-2) | 69.7 (1-2) | 69.7 (1-2) |
| Component (2) | 4.7 (2-1) | 4.7 (2-1) | 4.7 (2-1) | 4.7 (2-1) |
| Component (3) | 3.8 (3-1) | 3.8 (3-1) | 3.8 (3-1) | 3.8 (3-1) |
| Component (4) | 1.5 (4-2) | 0.5 (4-2) | 1.5 (4-2) | 2.5 (4-2) |
| Component (5) | 0.0 | 0.1<br>C12a: (5-1)<br>C12b: (5-2) | 0.1<br>C13a: (5-1)<br>C13b: (5-2) | 0.1<br>C14a: (5-1)<br>C14b: (5-2) |
| Component (6) | 15.3 (6-1) | 15.3 (6-1) | 15.3 (6-1) | 15.3 (6-1) |
| Component (7) | 0.0 | 0.0 | 0.0 | 0.0 |
| Component (8) | 4.0 (8-1) | 4.0 (8-1) | 4.0 (8-1) | 4.0 (8-1) |
| Component (9) | 0.7 (9-1) | 0.7 (9-1) | 0.7 (9-1) | 0.7 (9-1) |

TABLE 6

Composition of defoamer formulations - variation of the amount of component (4-2) at constant amount of acid (5)

| Example | C15a, C15b Parts (component used) | C16a, C16b Parts (component used) | C17a, C17b Parts (component used) |
|---|---|---|---|
| Component (1) | 69.7 (1-2) | 69.7 (1-2) | 69.7 (1-2) |

TABLE 6-continued

Composition of defoamer formulations - variation of the amount of component (4-2) at constant amount of acid (5)

| Example | C15a, C15b Parts (component used) | C16a, C16b Parts (component used) | C17a, C17b Parts (component used) |
|---|---|---|---|
| Component (2) | 4.7 (2-1) | 4.7 (2-1) | 4.7 (2-1) |
| Component (3) | 3.8 (3-1) | 3.8 (3-1) | 3.8 (3-1) |
| Component (4) | 3.5 (4-2) | 4.5 (4-2) | 5.5 (4-2) |
| Component (5) | 0.1 C15a: (5-1) C15b: (5-2) | 0.1 C16a: (5-1) C16b: (5-2) | 0.1 C17a: (5-1) C17b: (5-2) |
| Component (6) | 15.3 (6-1) | 15.3 (6-1) | 15.3 (6-1) |
| Component (7) | 0.0 | 0.0 | 0.0 |
| Component (8) | 4.0 (8-1) | 4.0 (8-1) | 4.0 (8-1) |
| Component (9) | 0.7 (9-1) | 0.7 (9-1) | 0.7 (9-1) |

TABLE 7

Composition of the defoamer formulations - variation of the amount of component (4-2) and acid (5); formulations C21a and C21b with component (7)

| Example | C18a, C18b Parts, (component used) | C19a, C19b Parts, (component used) | C20a, C20b Parts, (component used) | C21a, C21b Parts, (component used) |
|---|---|---|---|---|
| Component (1) | 69.7 (1-2) | 69.7 (1-2) | 69.7 (1-2) | 69.7 (1-2) |
| Component (2) | 4.7 (2-1) | 4.7 (2-1) | 4.7 (2-1) | 4.7 (2-1) |
| Component (3) | 3.8 (3-1) | 3.8 (3-1) | 3.8 (3-1) | 3.8 (3-1) |
| Component (4) | 0.5 (4-2) | 1.5 (4-2) | 2.5 (4-2) | 1.5 (4-2) |
| Component (5) | 0.2 C18a: (5-1) C18b: (5-2) | 0.4 C19a: (5-1) C19b: (5-2) | 0.6 C20a: (5-1) C20b: (5-2) | 0.1 C21a: (5-1) C21b: (5-2) |
| Component (6) | 15.3 (6-1) | 15.3 (6-1) | 15.3 (6-1) | 15.3 (6-1) |
| Component (7) | 0.0 | 0.0 | 0.0 | 10.0 |
| Component (8) | 4.0 (8-1) | 4.0 (8-1) | 4.0 (8-1) | 4.0 (8-1) |
| Component (9) | 0.7 (9-1) | 0.7 (9-1) | 0.7 (9-1) | 0.7 (9-1) |

EXAMPLES 4

TABLE 8

Rheological properties of defoamer formulations measured one day after preparation

| Formulation | Storage modulus G' [Pa] | Loss modulus G" [Pa] | Loss factor G"/G' | Viscosity at 1% def. and 1 Hz [mPa · s] |
|---|---|---|---|---|
| VC1 | 66.3 | 90.7 | 1.37 | 17,870 |
| VC2 | 74.2 | 96.8 | 1.31 | 19,400 |
| C11 | 57.1 | 83.8 | 1.47 | 16,130 |
| C1 | 66.3 | 89.2 | 1.35 | 17,680 |
| C13a | 59.9 | 86.8 | 1.45 | 16,790 |
| C13b | 60.1 | 87.7 | 1.46 | 16,920 |
| C3 | 72 | 94.8 | 1.32 | 18,940 |

TABLE 9

Rheological properties of defoamer formulations measured eight weeks after preparation

| Formulation | Storage modulus G' [Pa] | Loss modulus G" [Pa] | Loss factor G"/G' | Viscosity at 1% def. and 1 Hz [mPa · s] |
|---|---|---|---|---|
| VC1 | 337 | 159 | 0.471 | solid |
| VC2 | 139 | 118 | 0.848 | solid |
| C11 | 106 | 101 | 0.956 | solid |
| C1 | 353 | 159 | 0.449 | solid |
| C13a | 68.1 | 88.5 | 1.3 | 17,770 |
| C13b | 61.8 | 89.2 | 1.44 | 17,270 |
| C3 | 74.3 | 97 | 1.31 | 19,440 |

Table 9 shows that after eight weeks storage (at 25° C. and 101.425 kPa), the non-inventive formulation VC1 (only acid addition) has a gel-like structure (G'>G"), i.e. the formulation VC1 becomes solid, whereas the inventive formulations C13a, C13b and C3, which contain both a silanol-containing organopolysiloxane component (4) and an acid component (5), are still flowable even after eight weeks.

Comparison of non-inventive formulations C1 (with silanol-containing organopolysiloxane (4-1), but without added acid), C11 (with silanol-containing organopolysiloxane (4-2), but without added acid), VC2 (without silanol-containing organopolysiloxane, but with acid component (5-1)), with the inventive formulation C13a (with silanol-containing organopolysiloxane (4-1) and with acid component (5-1)) shows that the addition of both components (4) and (5) is essential compared to addition of only one component, since the inventive formulation C13a remains flowable only with the addition of both components (4) and (5) after eight weeks' storage (at 25° C. and 101.425 kPa), whereas the non-inventive formulations C1, C11 and VC2 solidify on storage (see Table 9).

Analogous to the defoamer formulations C3 and C13 according to the invention, the defoamer formulations C2, C4-C10, C12 and C14-C21 according to the invention are also still flowable after eight weeks' storage.

EXAMPLES 5

Testing the Defoamer Efficacy of Defoamer Formulations C3 and C9a According to the Invention and the Non-Inventive Defoamer Formulations VC1 and VC3 in Black Liquor Defoaming:

The inventive and non-inventive defoamer formulations thus obtained were examined in respect of the test in black liquor. The results of these tests are summarized in tables 10 and 11.

For better (more precise) metering, a mixture of 40 parts by weight of the defoamer formulations specified in tables 1-9 and 60 parts by weight of a mixture of aliphatic hydrocarbons having a viscosity of 3 mm$^2$/s and a flame point>100° C. was produced with a laboratory dissolver at 1000 min$^{-1}$.

400 ml of black liquor from the chemical pulp process are recirculated at a recirculation rate of 1.5 l/min in a 1000 ml recirculation apparatus temperature-controlled at 80° C. As soon as the foam level has reached a height of 75 mm, the defoamer is metered in and the foam collapse time and the lowest foam level achieved after addition of defoamer and initiation of foam collapse are noted.

The shorter the foam collapse time t1 and the lower the foam level h1, the better the rapid response of a defoamer. This is followed by determination of the long-term performance of the defoamer, represented by the time interval t2 required to return from the lowest foam level to the original foam level (75 mm).

TABLE 10

Results of testing of defoamer performance on black liquor from the chemical pulp process (hardwood from UPM Kymmene Oy, Kuusankoski, Finland) Metered addition: 5 µl of the above mixture of defoamer formulation and hydrocarbon mixture freshly produced

| Ex./ Comp. | Foam collapse time t1 in [s] | Foam level after foam collapse [mm] | Long-term performance t2 in [s] |
|---|---|---|---|
| VC3[1] | 15 | 23 | 88 |
| VC1 | 15 | 23 | 210 |

TABLE 10-continued

Results of testing of defoamer performance on black liquor from the chemical pulp process (hardwood from UPM Kymmene Oy, Kuusankoski, Finland) Metered addition: 5 µl of the above mixture of defoamer formulation and hydrocarbon mixture freshly produced

| Ex./ Comp. | Foam collapse time t1 in [s] | Foam level after foam collapse [mm] | Long-term performance t2 in [s] |
|---|---|---|---|
| C3 | 15 | 23 | 230 |
| C9a | 16 | 23 | 235 |

[1]Comparative test VC3 according to EP 434 060 A2

TABLE 11

Results of testing of defoamer performance on black liquor from the chemical pulp process (hardwood from UPM KAUKAS Lappeenranta, Lappeenranta, Finland) Metered addition: 5 µl of the mixture of defoamer formulation and hydrocarbon mixture prepared above after 9 weeks' storage at 50° C.

| Ex./ Comp. | Foam collapse time t1 in [s] | Foam level after foam collapse [mm] | Long-term performance t2 in [s] |
|---|---|---|---|
| VC3[1] | 16 | 25 | 105 |
| VC1 | 14 | 23 | 273 |
| C3 | 15 | 23 | 275 |
| C9a | 15 | 28 | 311 |

[1]Comparative test VC3 according to EP 434 060 A2

Table 10 shows that freshly prepared non-inventive formulation VC1 (without addition of silanol-containing organopolysiloxane) and freshly prepared inventive formulations C3 and C9a in these tests for defoaming hardwood black liquor, compared to the comparative formulation VC3, have a comparable foam collapse time t1 at the same foam height. However, the inventive examples C3 and C9a are characterized by a better long-term effect t2 compared to the non-inventive formulation VC1 and the formulation VC3 prepared in accordance with the prior art.

Table 11, which summarizes the results of defoaming of a hardwood black liquor after 9 weeks' storage of the formulations at 50° C., shows in the comparison of the non-inventive defoamer formulation VC1 and the inventive defoamer formulations C3 and C9a, compared to the defoamer formulation VC3 according to the prior art, that the addition of the acid component and the silanol-containing organopolysiloxane does not result in any appreciable deterioration in the foam collapse time t1 and in the foam level after foam collapse. Even after storage, the formulations according to the invention were able to achieve a significantly better long-term effect t2 compared to the defoamer formulation VC3 corresponding to the prior art.

The non-inventive example VC1 (without addition of silanol-containing organopolysiloxane), when comparing the stored products, shows a somewhat worse long-term effect t2 than the inventive examples C3 and C9a. Addition of the silanol-containing organopolysiloxane therefore has no negative influence on the long-term effect of the defoamer formulations after 9 weeks' storage at 50° C. The difference in the absolute values between Table 10 and 11 is due to the use of a different black liquor and and does not constitute any abnormal measurement characteristics nor any new knowledge to a person skilled in the art and shows the advantages of the defoamer formulations C3 and C9a according to the invention on different hardwood black liquors.

The invention claimed is:

1. A defoamer formulation, comprising:
(1) organopolysiloxane(s) containing per molecule at least one structural unit of formula $$O_{1/2}R_2Si\text{—}Y\text{—}SiRO_{2/2} \qquad (I)$$

and at least 2 units of formula $$R^1R_2\,SiO_{1/2} \qquad (II)$$

and units of general formula $$R_2SiO_{2/2} \qquad (III),$$

wherein

R each is identical or different and represents a monovalent SiC-bonded hydrocarbon radical having 1 to 30 carbon atoms which may contain one or more nonadjacent oxygen atoms and which is free from aliphatic carbon-carbon multiple bonds and $R^1$ each is R or an alkenyl radical having 2 to 30 carbon atoms, wherein at least one alkenyl radical per molecule is present, Y each individually represents a divalent hydrocarbon radical having 2 to 30 carbon atoms, with the proviso that the organopolysiloxane contains a structural element of formula $$R_2Y^2SiO\text{—}(SiR_2O)_{x1}\text{—}SiRY^1O\text{—}(SiR_2O)_{x2}\text{—}SiR_2R^1 \qquad (IV),$$

wherein
R and $R^1$ are as defined above,
$Y^1$ each individually represents a divalent hydrocarbon radical having 2 to 30 carbon atoms which is bonded to a group having the formula $SiR_2O_{1/2}$,
$Y^2$ each individually represents a divalent hydrocarbon radical having 2 to 30 carbon atoms which is bonded to a group having the formula $SiRO_{2/2}$, and
$x_1$ and $x_2$ is 0 or a positive integer,
with the proviso that the sum of $x_1+x_2$ is x,
wherein x is on average more than 5, and less than 100,
(2) fillers,
(3) organopolysiloxane resin(s) composed of units of formula $$R^2_e(R^3O)_fSiO_{(4-e-f)/2} \qquad (V),$$

wherein
$R^2$ each is identical or different and represents a hydrogen atom or a monovalent, optionally substituted, SiC-bonded hydrocarbon radical having 1 to 30 carbon atoms,
$R^3$ each is identical or different and represents a hydrogen atom or a monovalent, optionally substituted hydrocarbon radical having 1 to 4 carbon atoms,
e is 0, 1, 2 or 3 and
f is 0, 1, 2, or 3,
with the proviso that the sum of e+f is not more than 3 and that the sum of e+f is 2 in less than 50% of all units of formula (V) in the organopolysiloxane resin,
(4) silanol-containing organopolysiloxane(s) of the formula $$XSiR^4_2O\text{—}(SiR^4_2O)_n\text{—}SiR^4_2X \qquad (VI)$$

wherein
$R^4$ each is identical or different and represents a monovalent SiC-bonded hydrocarbon radical having 1 to 30 carbon atoms, which may contain one or more nonadjacent oxygen atoms, and X each is a hydrogen atom, an optionally substituted $C_1$-$C_{18}$-hydrocarbon radical, a $C_1$-$C_{18}$-alkoxy group or a hydroxyl group —OH,
n has integral values between 0 and 1000,
with the proviso that on average 30 to 60 mol %, of the groups X correspond to hydroxyl groups —OH,
wherein the silanol-containing organopolysiloxanes may also contain small proportions of branchings, as T units ($R^4SiO_{3/2}$) and/or Q units ($SiO_2$), wherein small proportions signify 0 to 1 mol %, based on the sum of all siloxane units in the organopolysiloxane, and
(5) at least one inorganic or organic acid.

2. The defoamer composition of claim 1, wherein $R^1$ are methyl and/or vinyl, X is on average more than 10 and less than 80, and n is between 10 and 400.

3. The defoamer formulation of claim 1, wherein Y and $Y^1$ and $Y^2$ are each a radical of formula $$\text{—}CH_2CH_2\text{—}.$$

4. The defoamer formulation of claim 1, wherein the organopolysiloxane(s) (1) are produced by reacting:
(A) oligomeric or polymeric organosilicon compounds containing units of formula $$R^1R_2SiO_{1/2} \qquad (II),$$

units of formula $$R_2\,SiO_{2/2} \qquad (III),$$

and units of formula $$HRSiO_{2/2} \qquad (VIII)$$

with the proviso that
at least one alkenyl radical $R^1$ per molecule is present,
the sum of the units $HRSiO_{2/2}$ and $R^1R_2SiO_{1/2}$ is on average greater than 2.0,
and the number of alkenyl radicals $R^1$ is on average greater than the number of Si-bonded hydrogen atoms
and optionally
(B) oligomeric or polymeric organosilicon compounds containing units of formula $$R^7R_2\,SiO_{1/2} \qquad (IX), \text{ and}$$

units of formula $$R_2\,SiO_{2/2} \qquad (III),$$

wherein
$R^7$ is an alkenyl radical having 2 to 30 carbon atoms,
are reacted in the presence of
(C) catalysts which promote the addition of Si-bonded hydrogen onto aliphatic double bonds,
wherein the ratio of aliphatic double bond in the components (A) and optionally (B) to Si-bonded hydrogen in the component (A) is 1.2 to 10.

5. The defoamer formulation of claim 4, wherein the organosilicon compound(s) (A) are those of the formula $$R^1R_2SiO\text{—}(SiR_2O)_x\text{—}(HSiR)_y\text{—}O\text{—}SiR_2R^1 \qquad (X),$$

wherein
y is on average at least 0.5, and on average at most 1.5,
with the proviso that at least one alkenyl radical $R^1$ per molecule is present,
the sum of the units $HRSiO_{2/2}$ and $R^1R_2SiO_{1/2}$ is on average greater than 2.0,
and the number of alkenyl radicals $R^1$ is on average greater than the number of Si-bonded hydrogen atoms.

6. The defoamer formulation of claim 4, wherein the organosilicon compounds (B) are those of formula $$R^7R_2SiO\text{—}(SiR_2O)_z\text{—}O\text{—}SiR_2R^7 \qquad (XI),$$

wherein z is on average more than 5, and less than 1000.

7. The defoamer formulation of claim 1, further comprising:
at least one of
(6) polyorganosiloxanes of formula $$R^5R_2SiO(SiR_2O)_mSiR_2R^5 \quad \text{or} \quad (VIIa)$$

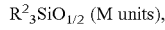
(VIIb)

wherein

R each is identical or different and is as defined above, $R^5$ each is identical or different and may be R or $-OR^6$, wherein $R^6$ each is a hydrogen atom or a monovalent, optionally substituted hydrocarbon radical having 1 to 25 carbon atoms, m is a positive integer, n is a positive integer, wherein the polyorganosiloxanes may also contain small proportions of T units ($R^5SiO_{3/2}$) and/or Q units ($SiO_2$), (7) water-insoluble organic compounds, (8) polyether-modified polysiloxanes which may be linear or branched and contain at least one polyether group and (9) alkaline or acidic catalysts or their reaction products with the components (1) to (8).

8. The defoamer formulation of claim 1, wherein the organopolysiloxane resins (3) are MQ resins comprising units of formulae $SiO_2$ (Q units), and $R^2{}_3SiO_{1/2}$ (M units), wherein the molar ratio of M units to Q units here is in the range from 0.5 to 2.0, the MQ resins optionally also contain, in addition to the M units and Q units, small amounts of $R^2SiO_{3/2}$ or $(R^3O)SiO_{3/2}$ (T) units or $R^2{}_2SiO_{2/2}$ (D) units in amounts of less than 0.01 to 20 mol %, based on the sum of all siloxane units, and the MQ resins optionally contain up to 10% by weight of free Si-bonded hydroxyl or alkoxy groups.

9. The defoamer formulation of claim 1, wherein the silanol-containing organopolysiloxane(s) (4) are those of the formula $$R'R^4{}_2SiO-(SiR^4{}_2O)_nSiR^4{}_2OH \qquad (VIa),$$

wherein $R^4$ each is identical or different and represents a monovalent SiC-bonded hydrocarbon radical having 1 to 30 carbon atoms, which may contain one or more nonadjacent oxygen atoms, and R' each is a hydrogen atom or an optionally substituted $C_1$-$C_{18}$-hydrocarbon radical which may contain one or more halogen, O, S or N atoms or one or more $-C(=O)-$ or $-C(=O)O-$ groups, and n has integral values between 50 and 250.

10. The defoamer formulation of claim 1, wherein the inorganic or organic acids (5) used are phosphoric acid, formic acid, acetic acid or propionic acid.

11. The defoamer formulation of claim 1, wherein the water-insoluble organic compounds (7) are those having a boiling point greater than 100° C. at 900 to 1100 hPa.

12. The defoamer composition of claim 11, wherein the water-insoluble organic compounds (7) are selected from the group consisting of mineral oils, natural oils, isoparaffins, polyisobutylenes, residues from oxo alcohol synthesis, esters of low molecular weight synthetic carboxylic acids, fatty acid esters, fatty alcohols, ethers of low molecular weight alcohols, phthalates, esters of phosphoric acid, waxes and mixtures thereof.

13. An emulsion comprising a defoamer formulation of claim 1,
Emulsifiers, and water.

14. A powder, comprising:
a defoamer formulation of claim 1, and a support material.

15. A washing or cleaning composition, comprising:
a defoamer formulation of claim 1, an emulsions thereof, or a powder thereof.

16. A process for defoaming and/or preventing foaming of a liquid medium, comprising:
mixing a defoamer formulation of claim 1, an emulsions thereof, or a powder thereof, with the liquid medium.

17. The process of claim 16, wherein the aqueous medium is one generated in chemical pulp production.

* * * * *

UNITED STATES PATENT AND TRADEMARK OFFICE
CERTIFICATE OF CORRECTION

PATENT NO. : 11,931,673 B2
APPLICATION NO. : 17/292572
DATED : March 19, 2024
INVENTOR(S) : Markus Grandl et al.

It is certified that error appears in the above-identified patent and that said Letters Patent is hereby corrected as shown below:

In the Claims

Column 30, Lines 54-55, Claim 5:
After "are those of the formula"
Delete "$R^1R_2SiO\text{-}(SiR_2O)_x\text{-}(HSiR)_y\text{-}O\text{-}SiR_2R^1$ (X)," and
Insert -- $R^1R_2SiO\text{-}(SiR_2O)_x\text{-}(HSiRO)_y\text{-}SiR_2R^1$ (X), --.

Signed and Sealed this
Eighth Day of October, 2024

*Katherine Kelly Vidal*
Katherine Kelly Vidal
*Director of the United States Patent and Trademark Office*